No. 751,631. PATENTED FEB. 9, 1904.
J. GLÜCK.
HOSE COUPLING.
APPLICATION FILED NOV. 20, 1903.
NO MODEL.
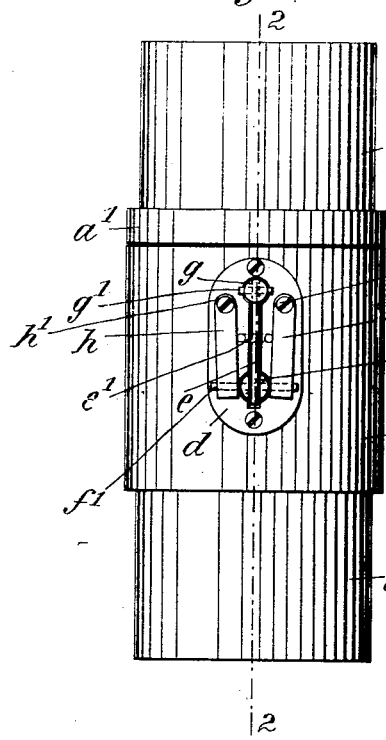
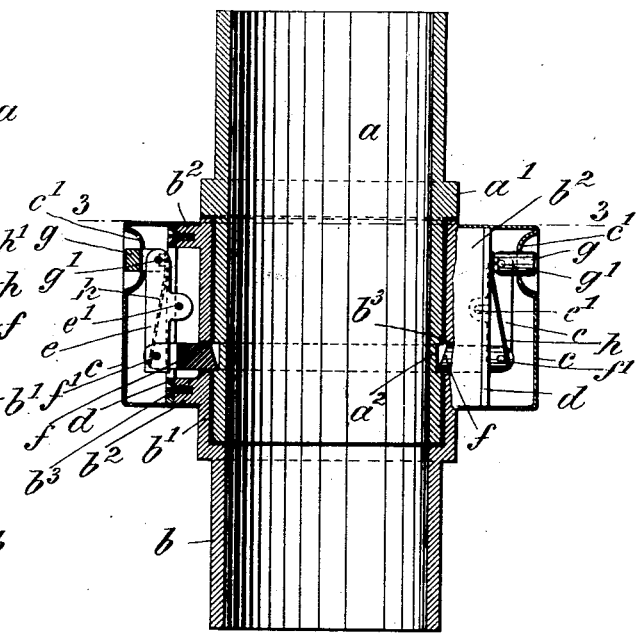
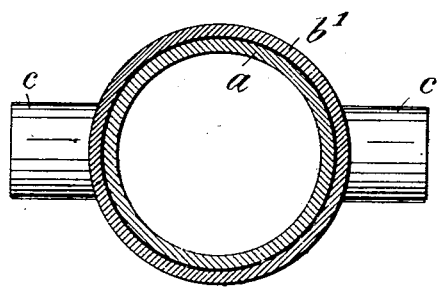
Witnesses:
Arthur Zumpe
William Schulz
Inventor:
Josef Glück
by Paul O. Briesen
Attorney.

No. 751,631. Patented February 9, 1904.

UNITED STATES PATENT OFFICE.

JOSEF GLÜCK, OF NEW YORK, N. Y.

HOSE-COUPLING.

SPECIFICATION forming part of Letters Patent No. 751,631, dated February 9, 1904.

Application filed November 20, 1903. Serial No. 181,913. (No model.)

*To all whom it may concern:*

Be it known that I, JOSEF GLÜCK, a citizen of Germany, residing at New York city, Manhattan, county and State of New York, have invented new and useful Improvements in Hose-Couplings, of which the following is a specification.

This invention relates to a hose-coupling which may be readily coupled and uncoupled and which connects the parts in a simple and reliable manner.

In the accompanying drawings, Figure 1 is a side elevation of my improved hose-coupling with the casing removed. Fig. 2 is a longitudinal section on line 2 2, Fig. 1, partly in elevation; and Fig. 3, a cross-section on line 3 3, Fig. 2.

The letter $a$ represents the male member, and $b$ the female member, of the coupling. The latter is expanded at its end to form a socket $b'$, which receives the end of the male member. A collar $a'$ on the male member abuts against the end of socket $b'$ and limits the length of section inserted.

At diametrically opposite points there are mounted upon the socket $b'$ a pair of housings $c$, each inclosing a slotted base-plate $d$, which is supported upon flanges $b^2$ of socket $b'$. To base-plate $d$ is fulcrumed at $e'$ a two-arm lever $e$, free to play in the slot of the base-plate. To one end of this lever is pivoted at $f'$ an inwardly-extending beveled bolt $f$, that projects through a perforation $b^3$ of socket $b'$. The other end of lever $e$ is connected by pivot $g'$ to a push-pin $g$, that extends outwardly and into a cup or concavity $c'$ of casing $c$. This cup admits the finger of the operator and prevents the push-pin from being accidentally moved inward by frictional contact with other objects. Upon pivot $f'$ bear a pair of springs $h$, attached to plate $d$ at $h'$ and tending to force the bolt $f$ inward.

The male member $a$ of the coupling is provided with an annular groove $a^2$, which is in alinement with the bolts $f$ when the coupling is closed. Thus when the end of the member $a$ is inserted into the socket $b'$ the bolts $f$ will be forced into engagement with the groove $a^2$ by the springs $h$. A pressure upon the pins $g$ will swing the levers $e$ to withdraw the bolts and permit the member $a$ to be withdrawn from the socket.

What I claim is—

1. A hose-coupling composed of a male member having a groove, a perforated female member, a lever pivotally connected thereto, a bolt and a push-pin pivoted to opposite ends of the lever, and a housing having a concavity around the push-pin, substantially as specified.

2. A hose-coupling composed of a female member having a perforated socket, a slotted base-plate secured thereto, a lever pivoted to the base-plate, a bolt and a push-pin pivoted to opposite ends of the lever, and a male member having a groove adapted to be engaged by the bolt, substantially as specified.

3. A hose-coupling provided with a female member having a flanged perforated socket, a base-plate supported upon the socket-flanges, a spring-influenced lever pivoted to the base-plate, a bolt and a push-pin pivoted to opposite ends of the lever, and a male member having a groove adapted to be engaged by the bolt, substantially as specified.

4. A hose-coupling provided with a female member having a flanged perforated socket, a slotted base-plate supported upon the socket-flanges, a spring-influenced lever pivoted to the base-plate, a bolt and a push-pin pivoted to opposite ends of the lever, a housing having a concavity around the push-pin, and a male member having a collar and a groove which is adapted to be engaged by the bolt, substantially as specified.

Signed by me at New York city, Manhattan, New York, this 19th day of November, 1903.

JOSEF GLÜCK.

Witnesses:
WILLIAM SCHULZ,
FRANK V. BRIESEN.